(12) United States Patent
Suga et al.

(10) Patent No.: US 7,715,060 B2
(45) Date of Patent: May 11, 2010

(54) IMAGE READING APPARATUS

(75) Inventors: Takayuki Suga, Ibaraki (JP); Takeshi Aoyama, Chiba (JP); Hyoe Iwata, Chiba (JP); Yukihiro Miura, Ibaraki (JP); Takehiro Kishi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1216 days.

(21) Appl. No.: 10/674,498

(22) Filed: Oct. 1, 2003

(65) Prior Publication Data

US 2004/0066544 A1 Apr. 8, 2004

(30) Foreign Application Priority Data

Oct. 7, 2002 (JP) ............................. 2002-293774

(51) Int. Cl.
*H04N 1/46* (2006.01)
*H04N 1/00* (2006.01)
*H04N 1/04* (2006.01)
*H04N 1/36* (2006.01)

(52) U.S. Cl. ...................... 358/474; 358/505; 358/408; 358/493; 358/409

(58) Field of Classification Search ................. 358/475, 358/483, 497, 487, 474; 359/869, 851; 435/7.21; 200/182; 356/450, 511
See application file for complete search history.

(56) References Cited

U.S. PATENT DOCUMENTS

| | | | | |
|---|---|---|---|---|
| 5,589,936 A | * | 12/1996 | Uchikawa et al. | ........... 356/450 |
| 5,648,221 A | * | 7/1997 | Suga | .......................... 435/7.21 |
| 5,844,730 A | * | 12/1998 | Aikawa et al. | .............. 359/851 |
| 5,883,727 A | * | 3/1999 | Tsai | ............................ 358/475 |
| 6,055,070 A | * | 4/2000 | Kang | .......................... 358/497 |
| 6,169,622 B1 | * | 1/2001 | Tsai et al. | .................... 358/474 |
| 6,216,952 B1 | * | 4/2001 | Mou | .......................... 358/475 |
| 6,236,472 B1 | * | 5/2001 | Tsai | ........................... 358/487 |

(Continued)

FOREIGN PATENT DOCUMENTS

JP 8-292371 11/1996

(Continued)

OTHER PUBLICATIONS

Japanese Office Action dated Nov. 11, 2008, in Japanese Application No. 2002-293774.

*Primary Examiner*—King Y Poon
*Assistant Examiner*—Akwasi M Sarpong
(74) *Attorney, Agent, or Firm*—Fitzpatrick, Cella, Harper & Scinto (57) ABSTRACT

An image reading apparatus accurately determines the positions of image forming mirrors formed with an off-axis reflecting surface, while enabling any thermal expansion caused by a rise in temperature due to a rise in the surrounding temperature to be absorbed. Each image forming mirror formed with an off-axis reflecting surface comprises respective and independent units for determining the positions in the longitudinal direction, in the lateral position, and in the direction orthogonal to the reflecting surface. Holes with which the longitudinal position determining units and the lateral position determining units engage have gaps in the directions orthogonal to the position determining directions to absorb the thermal expansion caused by a rise in the temperature of the image forming mirror when the position determining units engage with the holes. Determination of the position of the reflecting surfaces of the image forming mirrors is carried out by urging faces provided on the reflecting surface side against the housing.

14 Claims, 5 Drawing Sheets

U.S. PATENT DOCUMENTS

| | | | |
|---|---|---|---|
| 6,894,263 B2 | 5/2005 | Fujibayashi et al. | |
| 7,149,003 B2 * | 12/2006 | Mui et al. | 358/474 |
| 2002/0051242 A1 * | 5/2002 | Han et al. | 358/474 |
| 2002/0105734 A1 | 8/2002 | Kimura et al. | 359/729 |
| 2003/0038228 A1 | 2/2003 | Fujibayashi et al. | |
| 2005/0040021 A1 * | 2/2005 | Hall | 200/182 |

FOREIGN PATENT DOCUMENTS

| | | |
|---|---|---|
| JP | 3-113961 | 5/2001 |
| JP | 2002-196433 | 7/2002 |
| JP | 2002-267972 | 9/2002 |
| JP | 2002-335375 | 11/2002 |

* cited by examiner

IMAGE READING APPARATUS

BACKGROUND OF THE INVENTION

1. Field of the Invention

The present invention relates to an image reading apparatus that illuminates documents and reads the images of the documents by a photoelectric conversion unit, and particularly relates to an image forming unit that forms images on the photoelectric conversion unit.

2. Description of the Related Art

Hitherto, an image scanner for reading image data on documents has been known as an image reading apparatus, in Japanese Patent Laid-Open No. 3-113961, for example.

In such an image scanner, an image forming lens and a line sensor are fixed, and exposure scanning of a document is carried out by moving only reflecting mirrors, thus reading image data.

Recently, to simplify the structure of such an apparatus, carriage-integrated scanning systems that integrate mirrors, an image forming lens, and a line sensor, have been adopted to scan documents.

Figure 5:
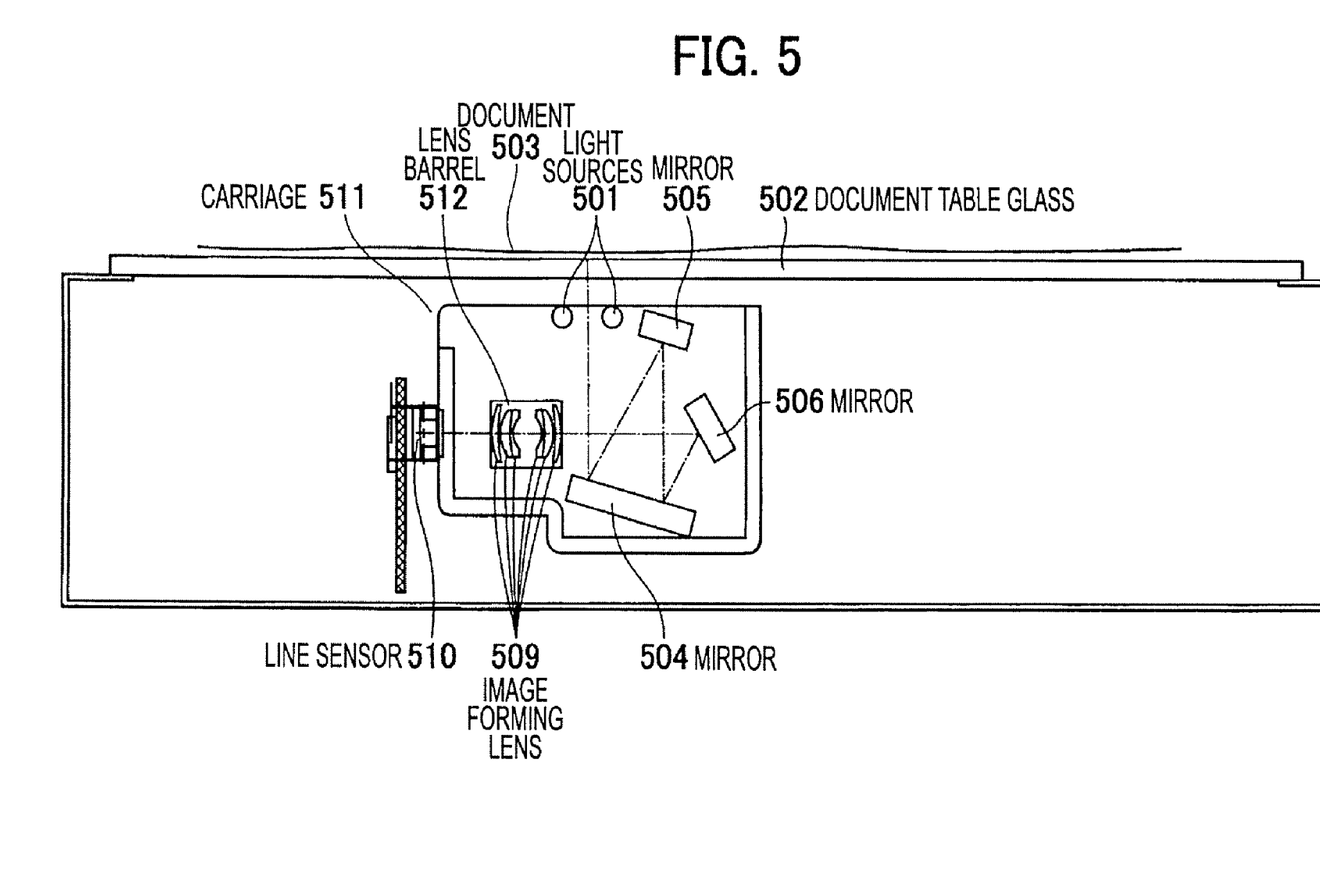
FIG. 5 is a diagram showing a schematic construction of a known image reading apparatus.

FIG. 5 shows an image reading apparatus of a known carriage-integrated scanning system. A light beam emitted by a light source 501 illuminates a document 503 mounted on a document table glass 502, then the reflected light beam from the document 503 gets bent along an optical path inside a carriage 511 through first to third mirrors 504 to 506, and thus an image forming lens 509 forms an image onto a line sensor 510 as the light beam passes through the image forming lens 509. The carriage 511 is moved by a driving motor (not shown) in the direction arrow A (feed direction) to read the image data of the document 503. The image forming lens 509 is fixed in a lens barrel 512, and the first to third mirrors 504 to 506 and the lens barrel 512 are fixed to the carriage 511.

In an image reading apparatus such as a digital copy machine, however, since high resolution and high speed are required, the field angle must be narrow to improve the resolution of the image forming lens, but then the length of the optical path is extended and the light quantity is decreased. If the optical path length is shortened, the field angle becomes wider, which lowers the resolution and thus makes it difficult to employ a carriage-integrated scanning system.

An image reading apparatus of a carriage-integrated scanning system adopting an off-axis optical system that forms an image by the reflection of a light beam, as disclosed in Japanese Patent Laid-Open No. 8-292371 or the like, is presented in Japanese Patent Laid-Open No. 2002-335375 (US Patent Application No. 20030038228). With respect to a reference axis along a light beam going through the image center and the pupil center, an off-axis optical system is defined as an optical system that includes a curved surface (off-axis curved surface) whose surface normal at the intersection point of the surface and the reference axis is not on the reference axis. In Japanese Patent Laid-Open No. 2002-335375, a construction that avoids chromatic aberration, with air as the medium between the reflecting surfaces of an off-axis optical system, particularly for scanning color documents, is presented.

SUMMARY OF THE INVENTION

To solve the above described problem with a known image reading apparatus, the present invention presents a construction for an image reading apparatus as follows.

The invention presents an image reading apparatus, for reading an image of a document, including an image reading unit for reading the image of the document; an illumination unit for illuminating the document; an image forming unit for forming the image of the document on the image reading apparatus, the image forming unit being constructed with a plurality of image forming mirrors formed with an off-axis reflecting surface with which a reference-axis ray has a different incident direction and reflected direction, the off-axis reflecting surface having a curvature; a housing for supporting the image reading unit, the illumination unit, and the image forming unit; and a scanning unit that moves the housing to perform scanning of the image of the document, wherein each of the image forming mirrors is disposed on a reflecting surface side thereof with urging parts being urged against the housing to determine the position of the reflecting surface.

The invention presents another image reading apparatus, wherein the urging parts provided on the image forming mirrors have a flat part.

The invention presents still another image reading apparatus, wherein the off-axis reflecting surface and the urging parts of each image forming mirror are formed integrally.

The invention presents yet another image reading apparatus, wherein the image forming mirrors comprise longitudinal position determining parts and lateral position determining parts for respectively and independently determining a longitudinal direction position and a lateral direction position.

The invention also presents another image reading apparatus, wherein either the longitudinal position determining parts or the lateral position determining parts provided on the image forming mirrors are formed on flat parts.

The invention presents still another image reading apparatus, wherein the longitudinal position determining parts and the lateral position determining parts provided on each image forming mirror determine the position of a reference axis of the off-axis reflecting surface of the image forming mirror.

The invention presents yet another image reading apparatus, wherein the off-axis reflecting surface, and the longitudinal position determining parts and the lateral position determining parts are formed integrally for each of the image forming mirrors.

The invention presents still another image reading apparatus, wherein the housing comprises respective engaging parts with which the longitudinal position determining parts and the lateral position determining parts of the image forming mirrors engage, and when the engaging parts, and the longitudinal position determining parts and the lateral position determining parts engage with each other, each portion of the engaging parts can slide in a direction orthogonal to a position determining direction, thereby allowing thermal expansion of the image forming mirrors.

Further objects, features and advantages of the present invention will become apparent from the following description of the preferred embodiments with reference to the attached drawings.

DESCRIPTION OF THE PREFERRED EMBODIMENTS

First Embodiment

Figure 1:
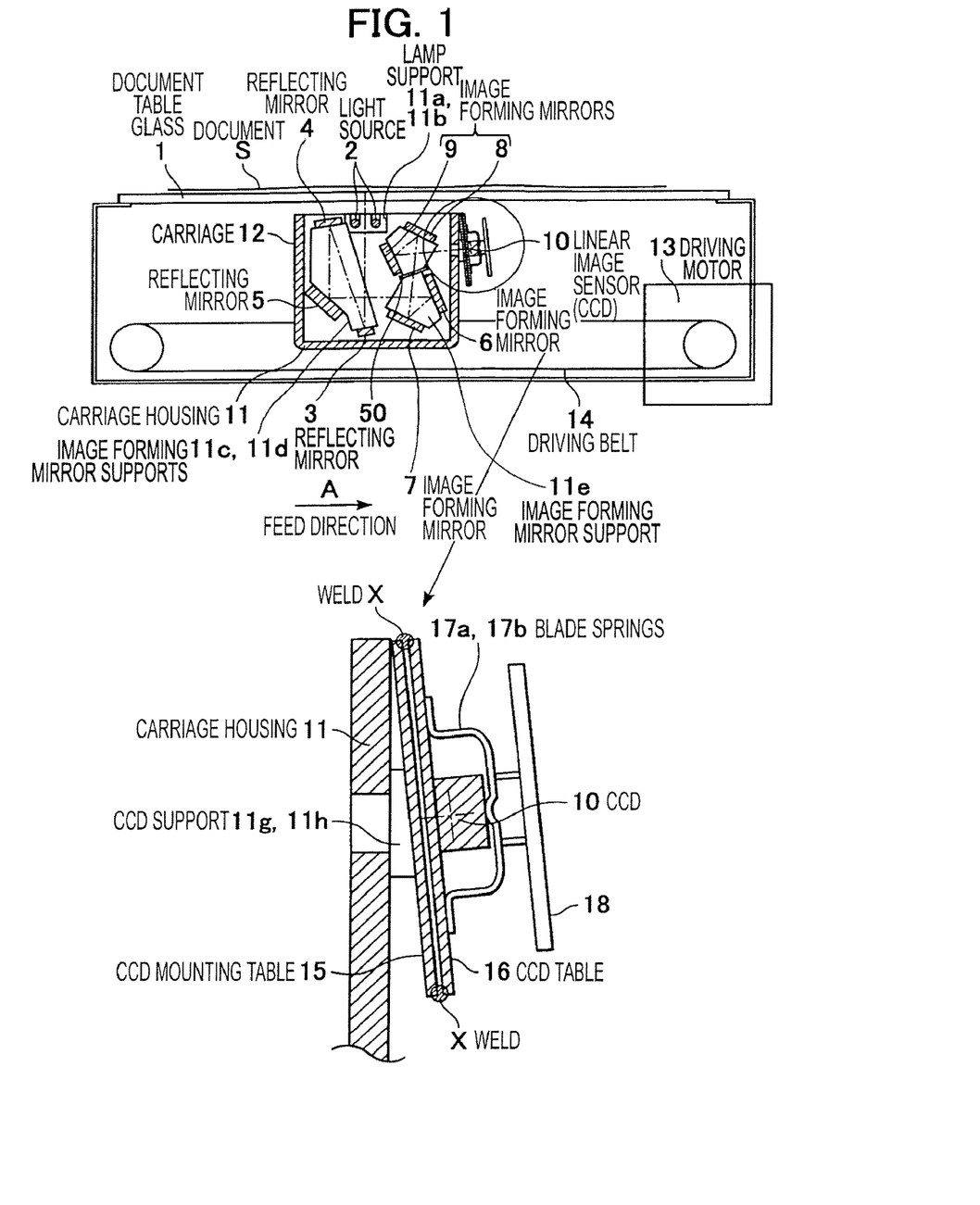
FIG. 1 is a cross sectional view showing a schematic construction of an image reading apparatus in a first embodiment according to the invention.
Figure 2:
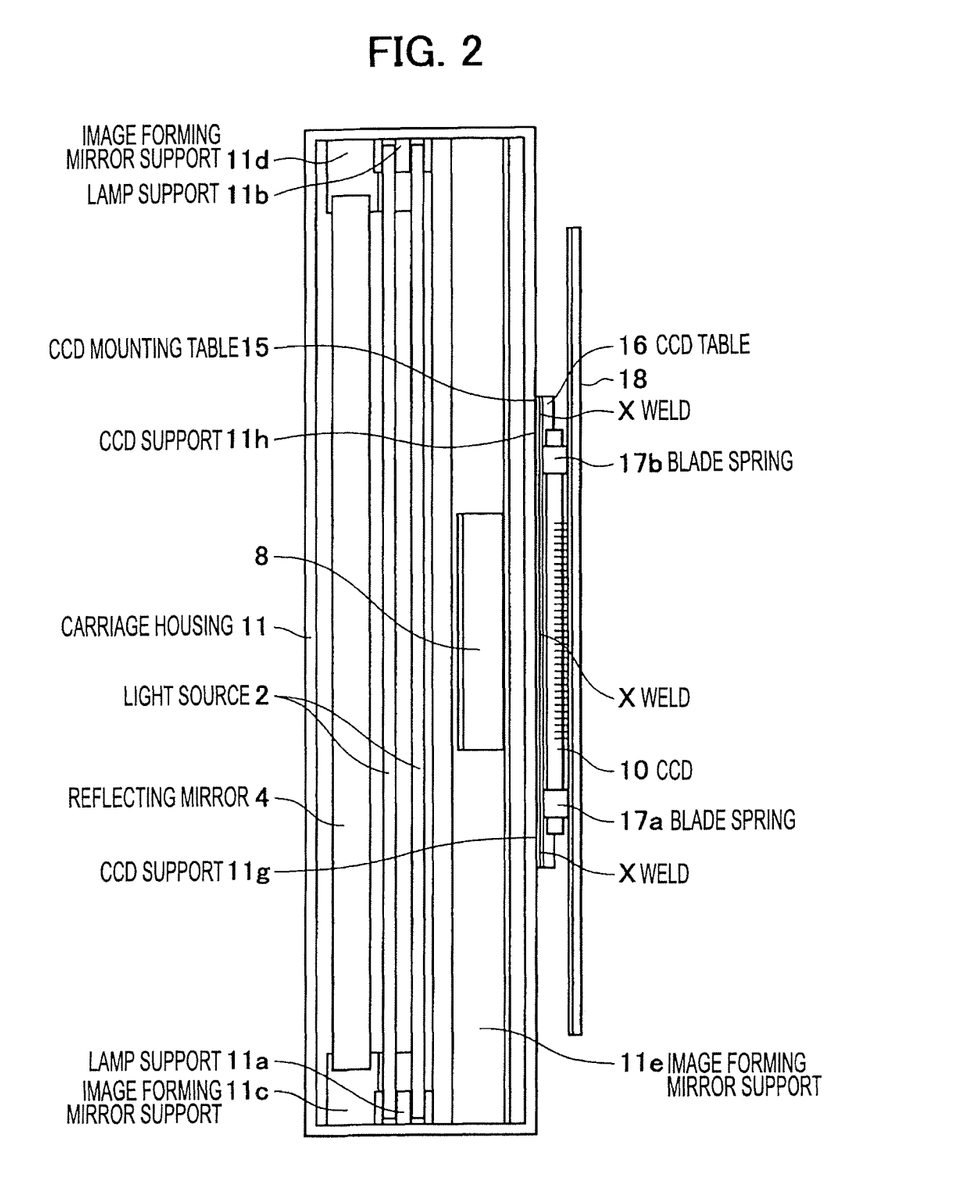
FIG. 2 is an enlarged top view of a part of the schematic construction according to the invention shown in FIG. 1.

FIG. 1 is a cross-sectional view of an essential part of an image reading apparatus in a first embodiment according to the invention; the apparatus is applied to a system such as an image scanner and a copy machine. FIG. 2 is a top view of a carriage 12 in FIG. 1.

In the figures, reference numeral 1 denotes a document table glass upon which a document S is mounted. Reference numeral 2 denotes a light source such as a xenon lamp, for example. Reference numerals 3 to 5 respectively denote first to third reflecting mirrors which bend the optical path of a light beam from the document S. Reference numerals 6 to 9 respectively denote first to fourth image forming mirrors formed with a single off-axis reflecting surface, wherein the image forming mirrors bend, with air as the medium, the light beam reflected from the image data of the document S and form an image on the surface of a reading unit 10. The first to fourth image forming mirrors 6 to 9 are formed of a resin such as polycarbonate. Reference numeral 10 denotes a linear image sensor (CCD), as a reading unit, that is constructed in such a manner that a plurality of light receiving elements is arranged in a single dimensional direction (main scanning direction). Reference numeral 11 denotes a housing of the carriage 12 that houses the light source 2, the first to third reflecting mirrors 3 to 5, the first to fourth image forming mirrors 6 to 9, and the CCD 10. The housing 11 is integrally formed with lamp supporting parts 11a and 11b, reflecting mirror supporting parts 11c and 11d, and an image forming mirror supporting part 11e. The light source 2 is positioned at the lamp supporting parts 11a and 11b and directly fixed thereto; the first to third reflecting mirrors 3 to 5 are likewise fixed to the reflecting mirror supporting parts 11c and 11d; and the first to fourth image forming mirrors 6 to 9 are likewise fixed to the image forming mirror supporting part 11e. Reference numeral 15 denotes a CCD mounting table which is directly fixed to CCD supporting portions 11g and 11h (in FIGS. 1 and 2, reference numerals 11g and 11h denote different portions of the same part), which are integrally formed on the housing 11. The CCD 10 is fixed on a CCD table 16 by blade springs 17a and 17b. The CCD mounting table 15 and the CCD table 16 are fixed to each other by a weld (X), where the position of the CCD 10 is adjusted such that the reading image quality (focus, geometric properties, etc.) of the image data read by the CCD 10 satisfies predetermined specifications. Reference numeral 13 denotes a driving motor which has a function to move the carriage 12 in the direction of arrow A in the figure through a driving belt 14 connected to the housing 11 and the driving motor 13.

In the present embodiment, the document S is illuminated by the light beam emitted from the light source 2; then, the reflecting light beam from the document S is bent along an optical path inside the carriage 12 by the first to third mirrors 3 to 5, and is further bent by the first to fourth image forming mirrors to form an image on the surface of the CCD 10. Then, the carriage 12 is moved by the driving motor 13 in the direction of arrow A (feed direction) to read the image data of the document S.

Figure 3:
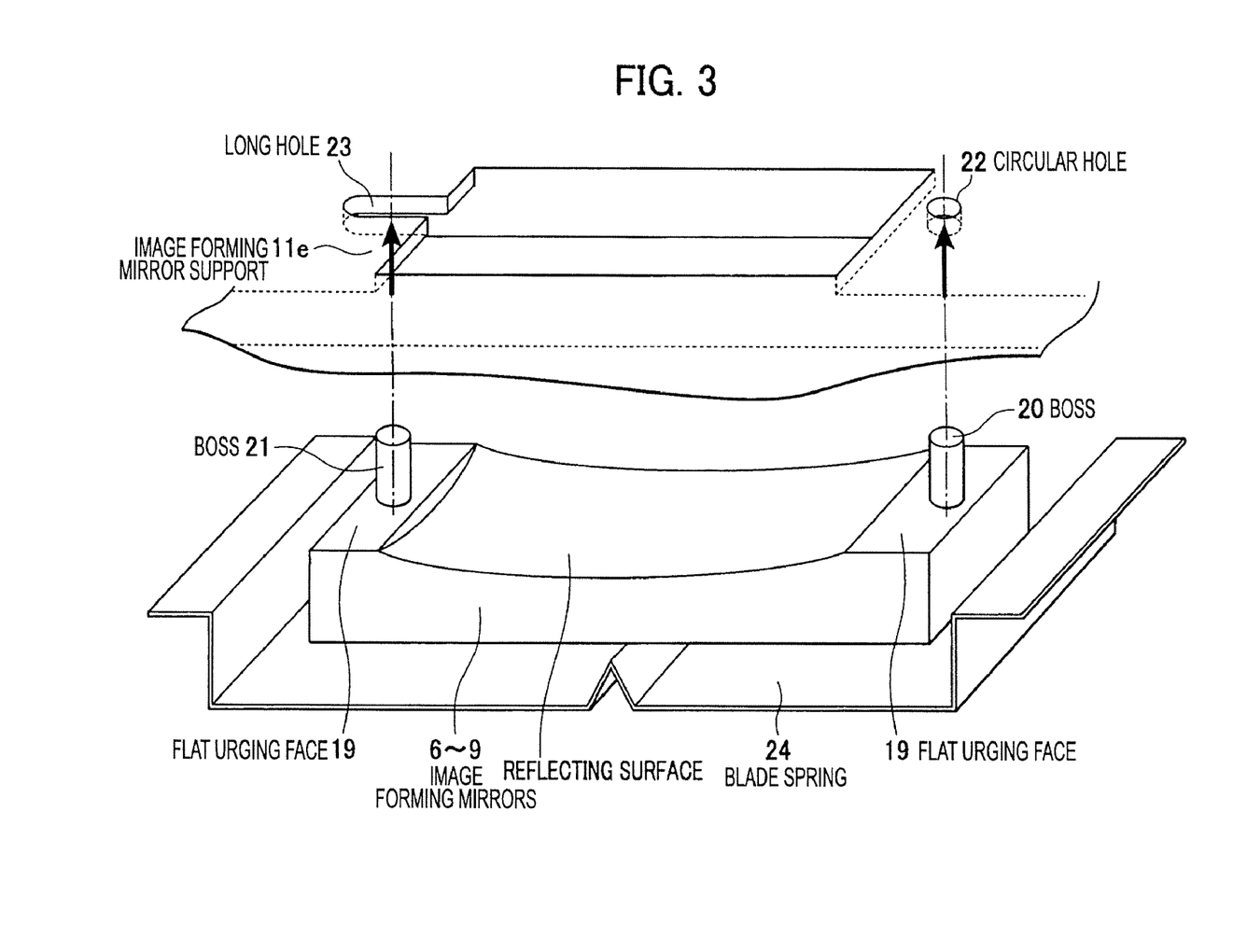
FIG. 3 is an enlarged perspective view of a part of the schematic construction according to the invention shown in FIG. 1.

FIG. 3 is an enlarged perspective view of a part where one of the first to fourth image forming mirrors 6 to 9 is fixed to the image forming mirror supporting part 11e provided on the housing 11. In FIG. 3, reference numerals 6 to 9 denote the first to fourth image forming mirrors; reference numeral 19 denotes flat urging faces that determine the position of the mirror surface provided on the mirror surface side of the image forming mirror; reference numerals 20 and 21 denote bosses that determine the positions of the image forming mirror in the longitudinal direction and the lateral direction; reference numerals 22 and 23 denote a circular hole and a long hole that are provided on the image forming mirror supporting part 11e and engaged with the bosses of the image forming mirror; and reference numeral 24 denotes a blade spring to fix one of the image forming mirrors 6 to 9 to the image forming mirror supporting part 11e.

The positions of the image forming mirrors 6 to 9 in the longitudinal direction and the lateral direction are determined by the engagement of the bosses 20 and 21 with the circular hole 22 and the long hole 23, the position of the mirror surface is determined by urging the urging faces 19 against the mirror supporting part 11e, and the image forming mirror is fixed by the pressure force of the blade spring 24.

The method of determining the positions of the image forming mirrors in the longitudinal direction and the lateral direction is not limited to the construction shown in the present embodiment; for example, the side faces of the image forming mirrors may be engaged with the housing, or the image forming mirrors may be fixed after determining the positions with a position determining tool.

Further, in addition to the method using the pressure force of a blade spring, the image forming mirrors may be fixed by bonding or screwing, for example.

Second Embodiment

A second embodiment of the invention will be described below with reference to FIG. 4. The essential construction of an image reading apparatus in the second embodiment is the same as that described in the first embodiment.

Figure 4:
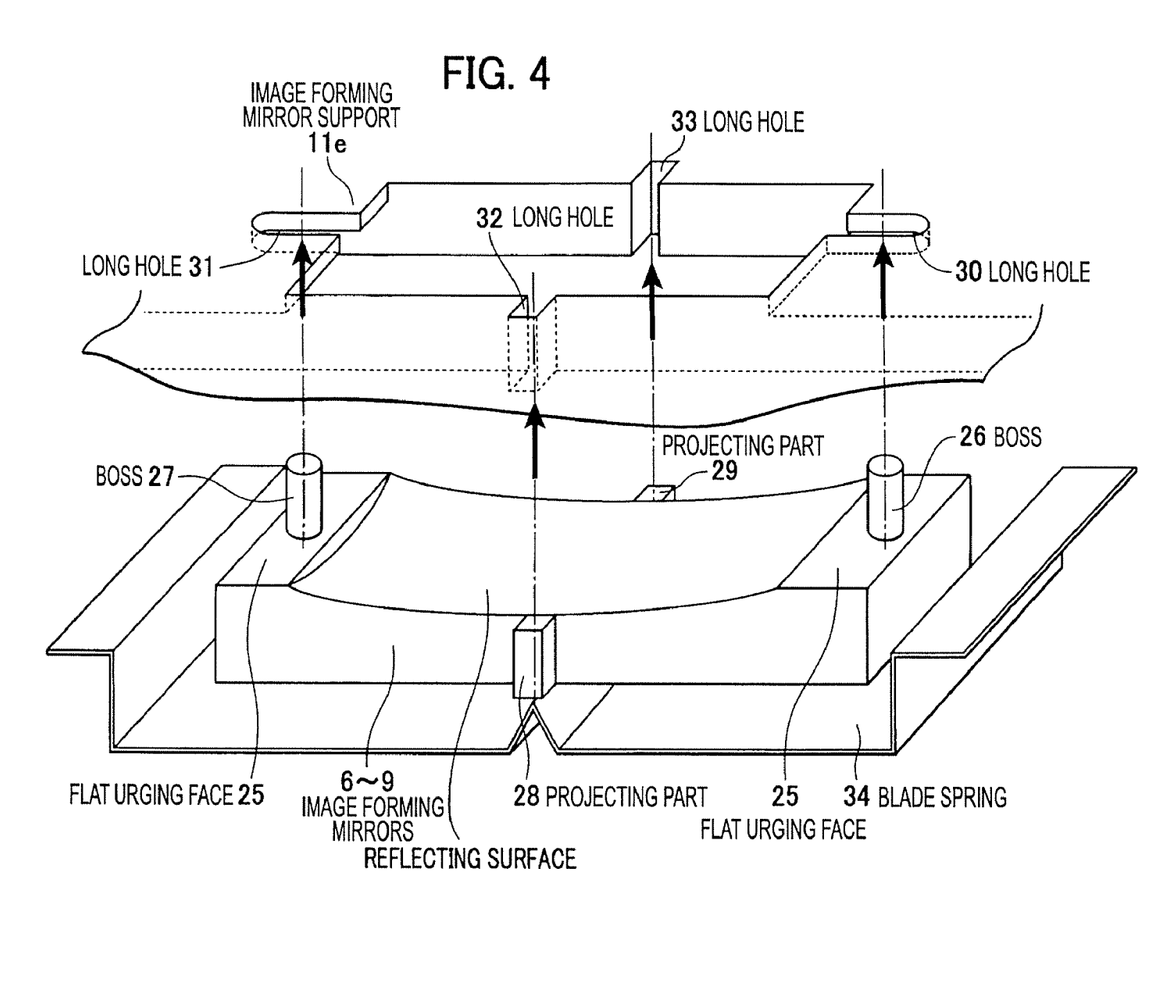
FIG. 4 is a diagram showing a construction of an image reading apparatus in a second embodiment according to the invention.

FIG. 4 is an enlarged perspective view of a part where one of the first to fourth image forming mirrors 6 to 9 in FIGS. 1 and 2 is fixed to the image forming mirror supporting part 11e provided on the housing 11. In FIG. 4, reference numerals 6 to 9 denote the first to fourth image forming mirrors; reference numeral 25 denotes flat urging faces that determine the position of the mirror surface provided on the mirror surface side of the image forming mirror; reference numerals 26 to 29 denote bosses and projecting parts (longitudinal position determining parts and lateral position determining parts) that determine the positions in the longitudinal direction and the lateral direction of the image forming mirror; reference numerals 30 to 33 denote long holes that are provided on the image forming mirror supporting part 11e and engaged with the bosses and the projecting parts of the image forming mirror; and reference numeral 34 denotes a blade spring to fix one of the image forming mirrors 6 to 9 to the image forming mirror supporting part 11e.

With respect to the positions of the image forming mirrors 6 to 9, the position in the lateral direction is determined by engaging the bosses 26 and 27 with the long holes 30 and 31; the position in the longitudinal direction is determined by the engagement of the projecting parts 28 and 29 with the long holes 32 and 33; the position of the mirror surface is determined by urging the urging faces 25 against the mirror supporting part 11e; and the image forming mirror is fixed by the pressure force of the blade spring 34.

Even when the image forming mirror expands more compared to the mirror supporting part with a rise in temperature in the housing 11, the long holes 30 to 33 and the projecting parts 26 to 29 slide along each other, and there are sufficient gaps in the position determination directions and the vertical direction; therefore, the expansion can be absorbed, thereby avoiding deformation of the reflecting surfaces of the image forming mirrors 6 to 9.

The image forming mirrors are disposed such that the intersection point of a line defined by the bosses 26 and 27 and a line defined by the projecting parts 28 and 29 corresponds with the position, on the surface of the mirror, where rays along the reference axis are reflected. If the mirror is disposed at this position, even if the mirror expands more compared to the mirror supporting part due to a rise in temperature, the position where the rays along the reference axis are reflected does not move, and thus it is possible to reduce the deterioration of the image forming accuracy.

The bosses and projecting parts provided on the image forming mirrors are not limited to the construction shown in the present embodiment; for example, it is possible to use only bosses or only projecting parts.

In addition to the method using the pressure force of a blade spring, the method of fixing an image forming mirror can be implemented, for example, by bonding or screwing, which allows fixing of the mirror with high accuracy. However, a method like that described in the present embodiment is desirable in order to absorb the expansion of the image forming mirrors due to a rise in temperature.

As described above, according to the invention, image forming mirrors formed with an off-axis reflecting surface can be positioned with high accuracy; also, the image forming mirrors can be supported while absorbing the thermal expansion when the temperature in the carriage rises, and thus it is possible to read the images of documents with high resolution and at high speed even with a carriage-integrated scanning system.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image reading apparatus for reading an image of a document, comprising:
   an image reading unit configured to read the image of the document;
   an illuminating unit configured to illuminate the document;
   a plurality of mirrors configured to reflect light from the document; and
   a housing configured to support the plurality of mirrors, said housing including a mirror supporting part including a hole for at least one of the plurality of mirrors,
   wherein at least one of the plurality of mirrors comprises:
      a curved reflecting mirror surface having two longitudinal ends and two lateral edges;
      first and second longitudinal portions, each positioned adjacent one of the longitudinal ends of the reflecting mirror surface and being contiguous therewith so as to extend therefrom; and
      a projection, separate from the reflecting mirror surface, positioned adjacent one of the lateral edges of the reflecting mirror surface, and projecting into the hole of the mirror supporting part, and disposed at a position corresponding to a reference axis of the curved reflecting mirror surface,
   wherein the reflecting mirror surface, the first and second longitudinal portions, and the projection are integrally formed as part of the mirror.

2. An image reading apparatus according to claim 1, further comprising two contact portions each provided on a different one of the first and second longitudinal portions and each having a flat portion.

3. An image reading apparatus according to claim 2, wherein the curved reflecting mirror surface and the contact portions of the mirrors are formed integrally.

4. An image reading apparatus according to claim 2, wherein the two contact portions comprise longitudinal position determining parts and the projection comprises a lateral position determining part for respectively and independently determining a longitudinal direction position and a lateral direction position of said at least one mirror.

5. An image reading apparatus according to claim 4, wherein either the longitudinal position determining parts or the lateral position determining part provided on the at least one of the mirrors are formed on flat portions.

6. An image reading apparatus according to claim 4, wherein the longitudinal position determining parts and the lateral position determining part provided on the at least one of the mirrors determine the position of a reference axis of the curved reflecting surface of the at least one of the mirrors.

7. An image reading apparatus according to claim 4, wherein the curved reflecting surface, and the longitudinal position determining parts and the lateral position determining part are formed integrally for the at least one of the mirrors.

8. An image reading apparatus according to claim 4, wherein the housing comprises engaging parts with which the longitudinal position determining parts of the at least one of the mirrors engage, and when the engaging parts, and the longitudinal position determining parts engage with each other, each portion of the engaging parts can slide in a direction orthogonal to a position determining direction, thereby allowing thermal expansion of the at least one of the mirrors.

9. An image reading apparatus according to claim 2, further comprising a spring configured and positioned to press the two contact portions against the housing to determine the position of the curved reflecting mirror surface.

10. An image reading apparatus according to claim 2, wherein the plurality of mirrors, each of which comprising the curved reflecting mirror surface and the two contact portions, is configured to form the image of the document onto the image reading unit, and a reference-axis ray has a different incident direction and reflected direction with the curved reflecting surface.

11. An image reading apparatus according to claim 1, further comprising a scanning unit configured to move the housing to perform scanning of the image of the document, wherein the housing further supports the image reading unit and the illumination unit.

12. An image reading apparatus according to claim 2, wherein the two contact portions are adjacent to the curved reflecting mirror surface.

13. An image reading apparatus according to claim 2, wherein the curved reflecting surface is between one of the two contact portions and the other of the two contact portions.

14. An image reading apparatus for reading an image of a document, comprising:

an image reading unit configured to read the image of the document;

an illuminating unit configured to illuminate the document;

a mirror configured to reflect and guide light from the document to said image reading unit, said mirror including a curved reflecting mirror surface having two longitudinal ends and two lateral edges;

first and second longitudinal portions, each positioned adjacent one of the longitudinal ends of the reflecting mirror surface and being contiguous therewith so as to extend therefrom;

a housing configured to support said mirror, said housing including a concave portion; and wherein said mirror comprises:

first and second longitudinal portions, each positioned adjacent one of the longitudinal ends of the reflecting mirror surface and being contiguous therewith so as to extend therefrom; and a projection, separate from the reflecting mirror surface, positioned adjacent one of the lateral edges of the reflecting mirror surface, and inserted into the concave portion of the housing, and disposed at a position corresponding to a reference axis of the curved reflecting mirror surface, wherein the reflecting mirror surface, the first and second longitudinal portions, and the projection are integrally formed as part of the mirror.

* * * * *